May 16, 1967 G. W. PARSONS ET AL 3,319,547
PHOTOGRAPHIC APPARATUS
Filed May 13, 1964 2 Sheets-Sheet 1

GEORGE W. PARSONS
RONALD G. PETTS
INVENTORS

BY *Joseph C. Ryan*

ATTORNEY

May 16, 1967  G. W. PARSONS ET AL  3,319,547
PHOTOGRAPHIC APPARATUS

Filed May 13, 1964  2 Sheets-Sheet 2

INVENTORS
GEORGE W. PARSONS
RONALD G. PETTS

3,319,547
PHOTOGRAPHIC APPARATUS
George W. Parsons, Hughesville, and Ronald G. Petts, Williamsport, Pa., assignors, by mesne assignments, to Eastman Kodak Company, Rochester, N.Y., a corporation of New Jersey
Filed May 13, 1964, Ser. No. 367,125
17 Claims. (Cl. 95—11)

This invention relates to photographic apparatus and more particularly to cameras which are provided with a flash-lamp attachment.

Over the years, flashlamp attachments have assumed many forms and shapes. In the early days of flashlamp photography, most flashlamp attachments were quite large in size relatively speaking with respect to the size of the cameras with which they were designed to be employed. This was due in part to the size of the flashlamps available commercialy at the time. In more recent years lamp manufacturers have introduced flashlamps of diminishing size. Fifteen years ago, the most popular flashlamp was the Press 25, a lamp having an internal volume of about 31 cc. Today the most popular flashlamp is the AG-1, a lamp having an internal volume of about 1.2 cc. This tremendous decrease in the size of the popular, commercial flashlamps has made it possible for the manufacturers of photographic equipment to redesign flashlamp attachments with a view to simplification and miniaturization. One form which this re-design has assumed has been the integration of the flashlamp assembly into the main body of a camera.

In certain cameras with integrated flashlamp assemblies, a well or chamber is provided in the main body of the camera to receive a flashlamp holder which includes a reflector therefor. Thus the flashlamp holder is normally telescoped or recessed within the main body of the camera. When use thereof is desired, the flashlamp holder is raised upwardly out of its chamber until it sits atop the camera. A flashlamp is inserted into the holder and, after a picture has been taken and the spent lamp removed, the holder is pushed back into its well or chamber in the main body of the camera.

A primary object of this invention is to effect a further improvement in the integration of the flashlamp function into cameras, particularly as it relates to the integration thereof with essentially camera operating functions.

In the co-pending application of L. F. Anderson et al., Ser. No. 335,013, filed January 2, 1964, and issued April 5, 1966, as U.S. Patent No. 3,244,087, there is disclosed a photographic flashlamp unit adapted to be mounted on the top of a camera. This unit comprises a package of photoflash lamps, each having its own reflector, and arranged with the depending electrical contacts thereof extending through a base member for engagement with electrical contacts associated with the main body of the camera.

The principal object of this invention is to provide means for integrating the operation of a flashlamp unit of the aforesaid type with the operation of a camera so that the operation of the flashlamp unit will be effected automatically by the operation of the camera.

This and other objects, advantages and features are attained in accordance with the principles of this invention, by providing a camera with mechanical means connecting the photographic flashlamp unit with a camera resetting mechanism such as the film advancing means so that actuation of the film advancing means to present the next film exposure frame to the shutter will automatically displace the photographic flashlamp unit and advance a new flashlamp into firing position. One of the features of the apparatus of this invention is the inclusion of automatic means for arresting the displacement of the flashlamp unit after a new lamp has been advanced into firing position, even if further operation of the film advancing means is required to complete the advancement of the next film exposure frame to the shutter.

In the accompanying drawing illustrating a specific embodiment of the invention:

Figure 1:
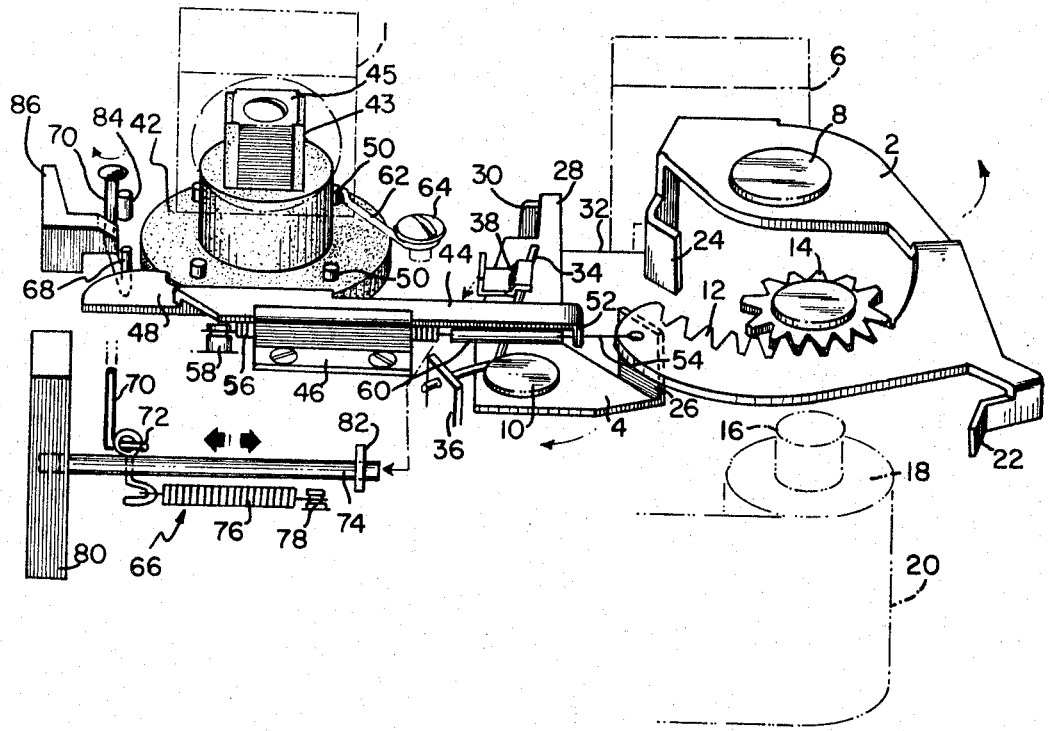
FIGURE 1 is a perspective view of a flashlamp unit actuating mechanism and a film advancing mechanism associated therewith.

Referring now to the drawing, the film advancing mechanism per se forms no part of this invention and has been disclosed merely for illustrative purposes, in order to show one form of film advancing mechanism with which the flashlamp unit actuating mechanism of this invention may be employed. The film advancing mechanism and the flashlamp unit actuating mechanism are located on suitable mounting surfaces on the top of the camera, immediately beneath a cover plate with which the top of the camera is provided. For clarity of illustration, these mounting surfaces have been omitted in the accompanying drawing.

The film advancing mechanism comprises a hand actuated, reciprocatable film advancing lever 2, a shutter actuating lever 4, and a shutter release 6. The film advancing lever 2 and the shutter actuating lever 4 are pivotally mounted at 8 and 10 respectively on suitable mounting surfaces in the camera. The shutter release 6 is supported from the front face of the camera.

The film advancing lever 2 is provided with a curved rack 12 which meshes with a pinion 14 fitted on spindle 16 of film take up spool 18. Thus film 20 is wound on spool 18 by actuation of lever 2, the lever being provided with a handle 22 for this purpose. An end of the film advancing lever 2 is provided with a depending tab 24 which, during a portion of the operating cycle of the lever 2, is displaced into engagement with a tab 26 upstanding on an end of the shutter actuating lever 4 to cock the actuating lever 4. The other end of the shutter actuating lever 4 is provided with a projecting finger 28 which, in the FIG. 1 position, is in engagement with a finger 30 formed on a lateral extension 32 of the shutter release 6. The shutter actuating lever 4 is a spring-loaded member, the torsion spring 34 performing this function. The spring 34 is looped around the pivot 10, one end thereof being anchored in a stationary plate 36 and the other end being constrained by the block 38 mounted on the top face of lever 4.

The operation of the film advancing mechanism will now be described. At the outset it should be noted that only the handle 22 of the film advancing lever 2 and the upper portion of the shutter release 6 lie outside the casing or face plates with which the main body of the camera is provided.

Figure 2:
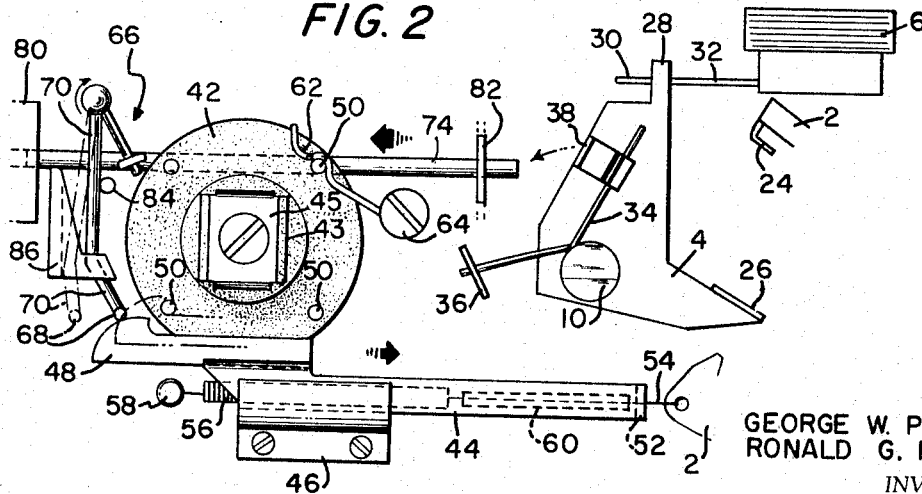
FIGURE 2 is a fragmentary plan view of the mechanism of FIGURE 1.

The mechanism just described is illustrated in FIGS. 1 and 2 in the cocked position, i.e., ready for a picture to be taken. A pictude is taken when an operator depresses the shutter release 6. When the shutter release 6 is pushed down, the finger 30 on the lateral extension 32 thereof moves downwardly therewith and out of interlocking engagement with the finger 28 of the shutter actuating lever 4. This releases the spring-loaded shutter actuating lever 4 and permits it to rotate counter-clockwise about its pivot 10 as viewed in FIGS. 1 and 2. It is during this counter-clockwise rotational movement that the projecting finger 28 of the lever 4 trips the shutter (not shown) to admit light to the film for the actual picture-taking operation. Pressure is then removed from the shutter release 6 to thereby permit it to return it to its normal rest position as shown in the accompanying drawing.

The camera is prepared or reset for the next exposure making or picture-taking operation by winding the film to advance the next exposure frame thereof and by cocking the shutter. This is accomplished by operation of the film advancing lever 2. The film advancing lever 2 is rotated counter-clockwise about its pivot 8 by manipulation of the handle 22 thereof, and this effects rotation of the spool 18 on which the film 20 is wound, through rack 12, pinion 14 and spindle 16. Since the shutter actuating lever 4 was displaced counter-clockwise somewhat from the FIG. 1 position during the previous picture-taking operation, the upstanding tab 26 thereof lies quite close to and in the path of this depending tab 24 of the film advancing lever 2. Thus, as the film advancing lever 2 is rotated counter-clockwise about its pivot 8 to advance the film 20, the depending tab 24 thereof engages and deflects tab 26 of the shutter actuating lever 4 causing clockwise rotation thereof about its pivot 10. As the shutter actuating lever 4 rotates clockwise about its pivot 10, the projecting finger 28 thereof rides up and over the finger 30 into interlocking engagement therewith. At about this time the film advancing lever 2 has been fully advanced in a counter-clockwise direction. Thus the handle 22 thereof may now be released to permit the return of the lever 2 to its normal position as shown in FIG. 1. The camera is now cocked for the taking of the next picture.

The mechanism for integrating the indexing of a flashlamp unit with a film advancing and shutter cocking means so that actuation of the latter will automatically effect indexing of the former will now be described. The flashlamp unit indexing mechanism is organized about a mounting plate (not shown) which is disposed at the top of a camera having an integral flashlamp assembly.

Figure 3:
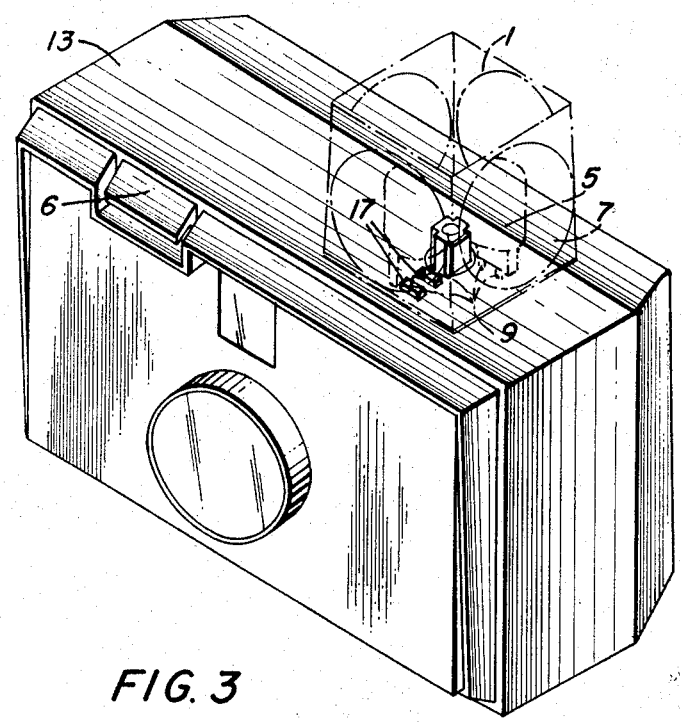
FIGURE 3 is a perspective view of a camera embodying the present invention with a flashlamp unit mounted thereon.

The indexing mechanism comprises a rotatable spindle 42, on which a flashlamp unit 1 of the type disclosed in the above-referenced Anderson et al. pending application is mounted, and a pawl 44 for rotating the spindle 42 and thus effect indexing of the flashlamp unit mounted thereon. Referring to FIGURE 3, the unit 1 comprises a plurality of photoflash lamps 5 with individual reflectors 7 and depending electrical contacts 9 extending through the base for electrical engagement with the electrical contacts 17 at the top of the camera casing 13. The spindle 42 is a substantially cylindrical member but has a mounting block 43 formed on the top thereof, to which a leaf spring 45 is attached. This block-spring arrangement defines a means accessible from outside the casing (FIG. 3) for supporting and retaining a flashlamp unit 1 on the spindle. The pawl 44 is a long finger-like linking member slidably disposed in a stationary pawl guide 46. One end of the pawl 44 is provided with a hook 48 which, when the pawl is advanced, engages one of several pins 50 upstanding on spindle 42 and through it rotatese the spindle 42 to effect indexing of the flashlamp unit mounted thereon. The other end of the pawl 44 is provided with a depending tab 52 having an aperture therein through which one end of a straight wire 54 extends, this end of the wire being connected to the free end of the curved rack 12 of the film advancing lever 2. The other end of the straight wire 54 is connected to and preferably formed integral with one end of a tension spring 56. The other end of the tension spring 56 is secured to a stationary spring pin 58. As shown in the accompanying drawing, the major portion of the tension spring 56 and the straight wire 54 which serves as an extension thereof lies beneath the finger-like pawl 44. A sleeve 60, concentric with the straight wire 54, is secured thereto and functions as a drive means engageable with tab 52 to advance the pawl 44 by transmitting force produced by actuation of the film advance lever to the pawl 44.

In operation, when the film advancing lever 2 is rotated counter-clockwise about its pivot 8 to wind the film and cock the shutter as described above, it draws the pawl 44 with it through the wire 54 which is connected to the free end of the curved rack 12 thereof. During the initial phase of this rotation of lever 2, the pawl 44 is canted sufficiently to displace the hook 48 thereof from solid to phantom in FIG. 2 and thus into interlocking engagement with a pin 50 to further transmit the produced force to the engaged pin 50. During this same initial phase of the rotation of lever 2, the straight wire 54 and the sleeve 60 concentric therewith are carried along therewith and the forward end of the sleeve 60 has moved into abutting engagement with the tab 52 depending from the front end of pawl 44. As the rotation of the lever 2 continues, the sleeve 60 now drives the pawl 44 forward with the hook 48 in engagement with pin 50 to thereby rotate the spindle 42 and thus the flashlamp unit mounted thereon about ninety degrees.

Since the flashlamp unit mounted on the spindle 42 is a foursided article with a flashlamp disposed on each side thereof, it is highly desirable to provide some means for arresting the rotation of the spindle 42 after it has rotated the desired ninety degrees so that proper disposition of a flashlamp for each new picture will be insured. A latch spring 62 overlying the spindle 42 is provided for this purpose. The spring 62, one end of which is held stationary by screw 64, is shaped intermediate its ends to define a camming surface and a notch so that each time the spindle 42 is rotated ninety degrees by the pawl 44 through the action of its hook 48 on one of the pins 50, the pin 50 located ninety degrees forward thereof will snap into locking engagement with latch spring 62.

With some cameras, more than operating stroke of the film advancing lever may be required to advance the film sufficiently to place a new exposure frame in the picture-taking position. The apparatus of our invention includes means for preventing further rotation of the spindle 42 after it has been advanced the prescribed ninety degrees, even though further operation of the film advancing lever 2 is effected. This is accomplished by a pawl lockout mechanism identified by the general reference number 66.

The pawl lockout mechanism 66 includes a stop 68 which is movable into and out of the path of the hook 48 of the pawl 44. The stop 68 is in the form of an upstanding finger formed on one end of a wire 70. The wire 70 extends through the mounting plate (not shown) on which the spindle 42 is supported, the other end of the wire 70 being connected to one end of a hook 72 fitted in an extending through a pawl stop actuating rod 74. The other end of hook 72 is connected to one end of a tension spring 76, the other end of spring 76 being secured to a fixed spring 78. The pawl stop actuating rod 74 is reciprocably supported between an outside wall 80 and an inside wall 82 of the camera body. One end of the rod 74 extends through the inside wall 82 and is actuated by the counter-clockwise rotation of shutter actuating lever 4 through the block 38 thereof.

As described above, when the shutter release 6 is actuated to take a picture, the shutter actuating lever 4 rotates counter-clockwise about its pivot 10 and, in doing so, the block 38 mounted thereon moves into engagement with and displaces the pawl stop actuating rod 74 to the left as viewed in FIGURES 1 and 2. Since the rod 74 is connected to wire 70 through hook 72, this displacement of rod 74 displaces the wire 70 from solid to phantom, as shown in FIGURE 2.

It will be noted particularly that this displaced locus of the stop 68 of the wire 70 places it out of the path of the travel of the hook end 48 of the pawl 44. Thus, when the first stroke is imparted to the film advancing lever 2 to advance the film and cock the shutter, the pawl 44 will be drawn forward therewith, the hook 48 thereof engaging a pin 50 on spindle 42 and rotating it counter-clockwise ninety degrees to thus locate a fresh flashlamp in picture-taking position. Since, as just noted, this first stroke of the film advancing lever cocks the shutter, this means that the block 38 on the shutter actuating lever 4 has been displaced from engagement with the pawl stop actuating rod 74. This permits the tension spring 76 to return the rod 74 to the position illustrated in FIGURES 1 and 2 and to displace the wire 70 and the stop 68 on an end thereof from phantom to solid in FIG. 2. Thus, when the pawl 44 returns, on the return of the first stroke of the film advancing lever 2, the stop 68 will be lying in the path of the hook 48 and will deflect it sufficiently so that if another stroke or a portion thereof is imparted to the film advancing lever 2 and the pawl 44 which is connected thereto, the hook 48 will be prevented from engaging a pin 50 and effecting further rotation of spindle 42. The pawl lockout mechanism 66 will remain in this lockout condition, regardless of how many strokes are imparted to the film advancing lever 2, until the next picture is taken, during which operation the shutter actuating lever 4 will have rotated counter-clockwise and the block 38 thereof will have displaced the pawl stop actuating rod 74 and thus the wire 70 from solid to phantom in FIG. 2 to thereby again permit the hook 48 of the pawl 44 to swing into engagement with a pin 50 of spindle 42 and rotate in ninety degrees counter-clockwise during the next stroke of the pawl 44. A pin 84 and a block 86, upstanding on the mounting plate (not shown) are located on opposite sides of the wire 70 and define stops to limit the displacement of the wire 70 during operation of the pawl lockout mechanism 66.

Specific embodiments of a film advancing mechanism, a photographic flashlamp unit and a mechanism for automatically effecting operation of the latter by operation of the former are illustrated in the accompanying drawing and described above. However, it will be readily appreciated by those skilled in the art that, without departing from the spirit of this invention, an interconnecting mechanism of the type to which this invention is directed may be readily employed with camera or other setting mechanisms and/or photographic flashlamp units other than those specifically illustrated and described herein.

What we claim is:

1. A flash attachment for use with a resettable mechanism in a camera operable to make an exposure, comprising in combination:
    means for detachably mounting and retaining a unitary flashlamp package having a plurality of flashlamps with an individual reflector for each flashlamp,
    indexing means operable to move the mounted flashlamp package and sequentially advance the package flashlamps to a predetermined operative position,
    means interconnecting the indexing means to the camera mechanism to operate the indexing means in response to resetting of the camera mechanism, and
    lockout means to disengage the interconnecting means to prevent further movement of the mounted flashlamp package after each advancement to the operative position, and to reengage the interconnecting means after firing of the flashlamp in the operative position.

2. The flash attachment according to claim 1 and further comprising latch means selectively engageable with the mounting means to arrest movement of the mounted flashlamp package after each advancement to the operative position.

3. The flash attachment according to claim 1 wherein the interconnecting means comprises pin means associated with the indexing means, a slidable pawl selectively engageable with the pin means, and drive means operatively connecting the pawl and the camera mechanism.

4. The flash attachment according to claim 3 wherein the pawl is laterally deflectable, and the lockout means comprises stop means to deflect the pawl laterally and prevent selective engagement with the pin means.

5. The flash attachment according to claim 1, wherein the camera mechanism includes a shutter member operable to make an exposure, the lockout means comprising a movable lockout mechanism engageable by the shutter member upon making an exposure to move to a position disengaging the interconnecting means, the lockout mechanism being biased to a nondisengaging position.

6. The flash attachment according to claim 1 wherein the indexing means comprises a rotatable spindle and the interconnecting means comprises a guided linking member selectively connectable at one end with the spindle and at the other end with the camera mechanism.

7. In a photographic camera operable to make an exposure, the combination comprising:
    a resetting mechanism actuatable to set the camera for an exposure making operation,
    means to detachably mount and retain a unitary flashlamp package having a plurality of flashlamps with a respective individual reflector for each flashlamp,
    driving means movable to displace a mounted flashlamp package and sequentially advance the package flashlamps to a predetermined operative position, the driving means comprising a spindle rotatable about an axis of rotation with the mounted flashlamp package rotatable therewith, and including a plurality of pins about the axis of rotation, and
    means mechanically linking the resetting mechanism and the driving means to transmit to the driving means force produced by actuation of the resetting mechanism and cause the driving means to displace the mounted flashlamp package, the mechanical linking means comprising a guided linking pawl slidably disposed in a guide and engageable at one end with the spindle and at the other end with the resetting mechanism, the pawl having a hook selectively engageable with the pins to transmit the produced force to the spindle to cause rotation of the spindle and mounted flashlamp package through a predetermined number of degrees.

8. The combination according to claim 7 and further comprising means to prevent engagement of a spindle pin by the pawl hook and prevent further rotation of the mounted flashlamp package after each advancement to the operative position, the disengaging means comprising a lockout stop biased to move into the path of movement of the pawl hook to prevent engagement with the spindle pins.

9. The combination according to claim 8 wherein the resetting mechanism includes a shutter actuating member operable to make an exposure and further comprising means responsive to operation of the shutter actuating member to move the lockout stop out of the path of movement to the pawl hook.

10. In the photographic camera operable to make an exposure, the combination comprising
    a casing including electrical contacts,
    a resetting mechanism within the casing including a film winding member and a shutter setting member actuatable to set the camera for an exposure making operation,
    a spindle within the casing, the spindle being rotatable about an axis of rotation,
    a mounting block and spring rotatable with the spindle, the block and spring being accessible from outside the casing to detachably support and retain for rotation therewith a unitary flashlamp package comprising a plurality of photoflash lamps, each flashlamp having its own reflector and depending electrical contacts extending through the package base for selective electrical engagement with the casing contacts at a flashlamp firing locus,
    a movable handle accessible from outside the casing and operable when moved to produce a force which actuates the resetting mechanism, and a linkage mechanically connecting the handle and the spindle to rotate the spindle by the handle when moved to actuate the setting mechanism to transmit the produced force to the spindle and rotate the spindle and supported flashlamp package to sequentially advance the flashlamps to the firing locus with sequential settings of the camera.

11. The combination according to claim 10 wherein the spindle includes a plurality of pins about the axis of rotation thereof, and the mechanical linkage includes a slidable pawl selectively engaging a respective pin to rotate the spindle a predetermined amount.

12. The combination according to claim 11 and further comprising a lockout stop biased to engage the pawl after each spindle rotation to prevent further engagement of a pin by the pawl while permitting further actuation of the setting mechanism, and means responsive to the shutter setting member to move the stop out of engagement with the pawl after operation of the camera.

13. The combination according to claim 11 and further comprising a latch spring biased to engage a spindle pin and terminate rotation of the spindle.

14. In a photographic camera operable to make an exposure, the combination comprising:
 a casing including electrical contacts,
 a manually movable member accessible from outside the casing,
 a preparing mechanism within the casing actuatable to at least partially prepare the camera for an exposure making operation, the mechanism including means responsive to movement of the manually movable member to produce a force actuating the preparing mechanism,
 a spindle within the casing rotatable about an axis of rotation, the spindle having mounting means accessible from outside the casing to detachably support and retain for rotation a unitary flashlamp package comprising a plurality of photoflash lamps, each lamp having its own reflector and depending electrical contacts extending through the package base for selective electrical engagement with said casing contacts at a lamp firing locus, and
 linking means mechanically linking the preparing mechanism and the spindle to transmit said actuating force from the preparing mechanism to the spindle to rotate the spindle and supported flashlamp package by the transmitted force for sequential advancement of the package lamps to the firing locus with sequential preparations of the camera for exposure making operations.

15. The combination according to claim 14 and further comprising lockout means to disengage the linking means after advancement of a package lamp to the firing locus and to reengage the linking means after camera operation.

16. The combination according to claim 15 wherein the camera includes a shutter driver, and the lockout means comprise a stop member movable in response to the position of the shutter driver to control engagement of the linking means.

17. The combination according to claim 14 and further comprising a latch engaging the spindle to arrest rotation after each advancement of a package lamp to the firing locus.

References Cited by the Examiner
UNITED STATES PATENTS

| | | | |
|---|---|---|---|
| 2,258,575 | 10/1941 | McKay | 240—37.1 |
| 2,408,470 | 10/1946 | Noel | 240—37 |
| 2,671,387 | 3/1954 | Knight | 95—11.5 |
| 3,080,804 | 3/1963 | Steineck | 95—11.5 |
| 3,087,318 | 4/1963 | Oswold | 67—31 |

FOREIGN PATENTS 848,012  1/1952  Germany.

JOHN M. HORAN, *Primary Examiner.*